(12) United States Patent
Chen et al.

(10) Patent No.: US 11,044,760 B2
(45) Date of Patent: Jun. 22, 2021

(54) METHODS AND RELATED DEVICES FOR TRANSMITTING IDENTIFICATION INFORMATION OF USER EQUIPMENT DURING RANDOM ACCESS PROCEDURE

(71) Applicant: FG Innovation Company Limited, Tuen Mun (HK)

(72) Inventors: Hung-Chen Chen, Hsinchu (TW); Chie-Ming Chou, Hsinchu (TW)

(73) Assignee: FG Innovation Company Limited, Tuen Mun (HK)

( * ) Notice: Subject to any disclaimer, the term of this patent is extended or adjusted under 35 U.S.C. 154(b) by 130 days.

(21) Appl. No.: 16/403,648

(22) Filed: May 6, 2019

(65) Prior Publication Data

US 2019/0350002 A1    Nov. 14, 2019

Related U.S. Application Data

(60) Provisional application No. 62/668,402, filed on May 8, 2018.

(51) Int. Cl.
| | |
|---|---|
| *H04W 74/08* | (2009.01) |
| *H04W 74/00* | (2009.01) |
| *H04W 8/26* | (2009.01) |
| *H04W 72/14* | (2009.01) |
| *H04W 72/12* | (2009.01) |
| *H04W 76/27* | (2018.01) |

(52) U.S. Cl.
CPC ......... *H04W 74/0833* (2013.01); *H04W 8/26* (2013.01); *H04W 72/1268* (2013.01); *H04W 72/14* (2013.01); *H04W 74/002* (2013.01); *H04W 76/27* (2018.02)

(58) Field of Classification Search
CPC . H04W 74/0833; H04W 74/002; H04W 8/26; H04W 72/1268; H04W 72/14; H04W 76/27
See application file for complete search history.

(56) References Cited

U.S. PATENT DOCUMENTS

| | | | |
|---|---|---|---|
| 10,660,150 B2* | 5/2020 | Schliwa-Bertling | ........................ H04W 76/19 |
| 2013/0155981 A1 | 6/2013 | Kitazoe | |
| 2019/0045573 A1* | 2/2019 | Schliwa-Bertling | ........................ H04W 76/11 |
| 2019/0059108 A1* | 2/2019 | Wikstrom | ......... H04W 74/0833 |
| 2020/0154484 A1* | 5/2020 | Ohara | ............... H04W 74/0833 |

FOREIGN PATENT DOCUMENTS

| | | |
|---|---|---|
| WO | 2011066797 A1 | 6/2011 |
| WO | 2017134630 A1 | 8/2017 |

* cited by examiner

*Primary Examiner* — Melvin C Marcelo
(74) *Attorney, Agent, or Firm* — ScienBiziP, P.C.

(57) ABSTRACT

A method for transmitting identification information of a User Equipment (UE) during a Random Access (RA) procedure is provided. The method includes transmitting, by a UE, a first part of a UE Identity (ID) to a base station; transmitting, by the UE, a second part of the UE ID to the base station; and receiving, by the UE, a contention resolution message from the base station, where the contention resolution message includes a UE contention resolution ID determined based on the first part of the UE ID and the second part of the UE ID.

12 Claims, 8 Drawing Sheets

METHODS AND RELATED DEVICES FOR TRANSMITTING IDENTIFICATION INFORMATION OF USER EQUIPMENT DURING RANDOM ACCESS PROCEDURE

CROSS-REFERENCE TO RELATED APPLICATION(S)

The present application claims the benefit of and priority to a provisional U.S. Patent Application Ser. No. 62/668,402 filed on May 8, 2018, entitled "Mechanism for Handling Different ID Size Transmitting in MSG 3," (hereinafter referred to as "US73640 application"). The disclosure of the US73640 application is hereby incorporated fully by reference into the present application.

FIELD

The present disclosure generally relates to wireless communications, and more particularly, to methods and related devices for transmitting identification information of a User Equipment (UE) during a Random Access (RA) procedure.

BACKGROUND

Various efforts have been made to improve different aspects of wireless communications (e.g., data rate, latency, reliability, mobility, etc.) for the next generation (e.g., 5G New Radio (NR)) wireless communication systems. For example, compared to the legacy wireless communication systems (e.g., Long Term Evolution (LTE) systems), the next generation wireless communication systems provide better identification method for the UEs (e.g., by providing additional bits in a data structure that represents a UE's identification).

However, as the number of bits of the UE's identification information increases, the UE may not be able to transmit the complete identification information to a base station (BS) in a single message (e.g., a Message 3 (MSG3)) during an RA procedure.

Therefore, there is a need in the art for an improved mechanism for transmitting the identification information of a UE during an RA procedure.

SUMMARY

The present disclosure is directed to methods and related devices for transmitting the identification information (e.g., a UE Identity (ID)) of a UE during an RA procedure.

According to an aspect of the present disclosure, a method for wireless communications is provided. The method includes transmitting, by a UE, a first part of a UE ID to a BS; transmitting, by the UE, a second part of the UE ID to the BS; and receiving, by the UE, a contention resolution message from the BS, wherein the contention resolution message includes a UE contention resolution ID determined based on the first part of the UE ID and the second part of the UE ID.

According to another aspect of the present disclosure, a UE is provided. The UE includes one or more non-transitory computer-readable media having computer-executable instructions embodied thereon and at least one processor coupled to the one or more non-transitory computer-readable media. The at least one processor is configured to execute the computer-executable instructions to transmit a first part of a UE ID to a BS; transmit a second part of the UE ID to the BS; and receive a contention resolution message from the BS, wherein the contention resolution message comprises a UE contention resolution ID determined based on the first part of the UE ID and the second part of the UE ID.

BRIEF DESCRIPTION OF THE DRAWINGS

Aspects of the exemplary disclosure are best understood from the following detailed description when read with the accompanying figures. Various features are not drawn to scale. Dimensions of various features may be arbitrarily increased or reduced for clarity of discussion.

DETAILED DESCRIPTION

Figure 1:
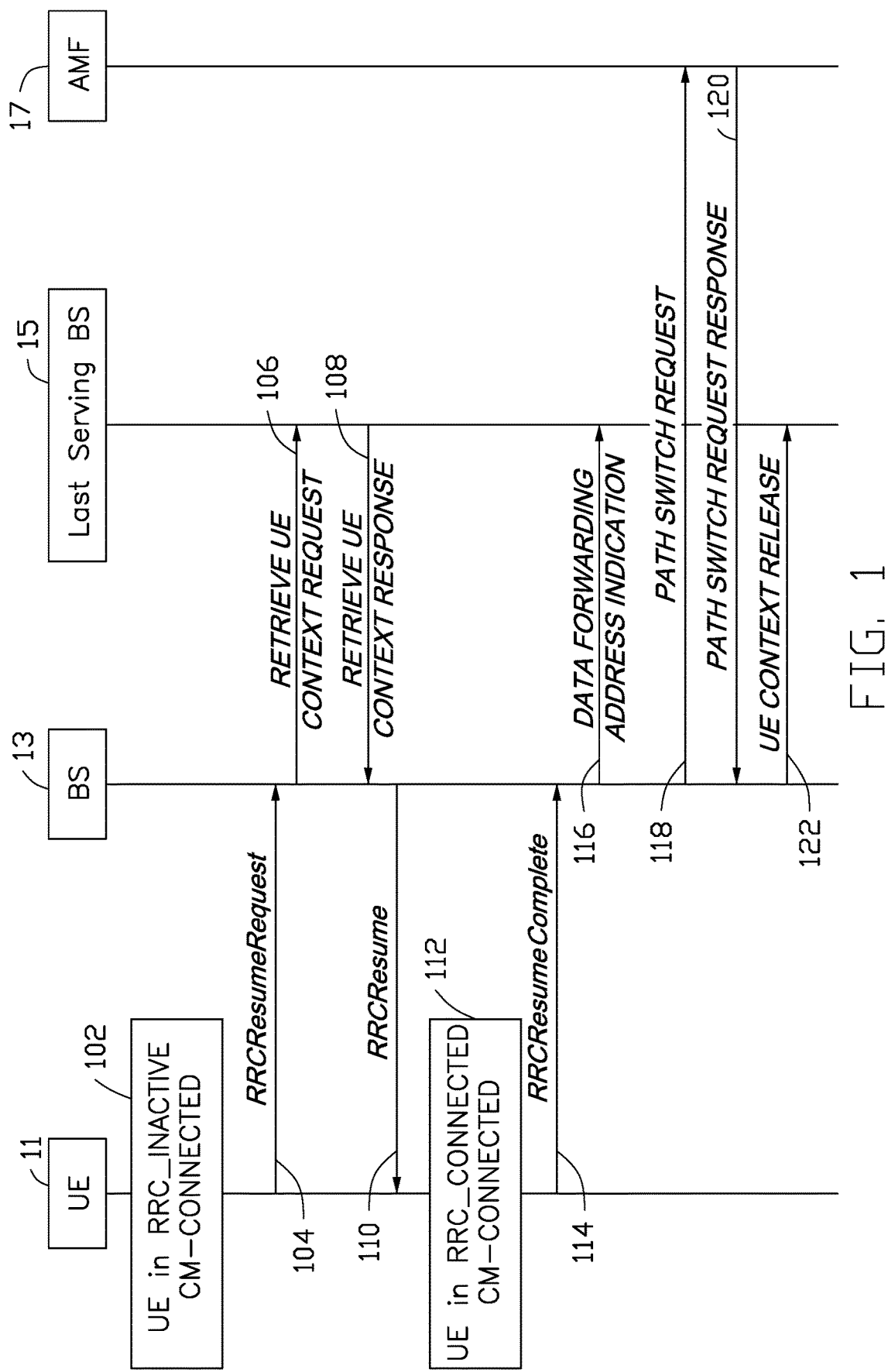
FIG. 1 is a schematic diagram illustrating a signaling flow of a Radio Resource Control (RRC) state transition process for a UE, in accordance with example implementations of the present disclosure.

The following description contains specific information pertaining to exemplary implementations in the present disclosure. The drawings in the present disclosure and their accompanying detailed description are directed to merely exemplary implementations. However, the present disclosure is not limited to merely these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features are identified (although, in some examples, not shown) by numerals in the example figures. However, the features in different implementations may be differed, in other respects, and thus shall not be narrowly confined to what is shown in the figures.

References to "one implementation," "an implementation," "example implementation," "various implementations," "some implementations," "implementations of the present application," etc., may indicate that the implementation(s) of the present application so described may include a particular feature, structure, or characteristic, but not every possible implementation of the present application necessarily includes the particular feature, structure, or characteristic. Further, repeated use of the phrase "in one implementation," or "in an example implementation," "an implementation" do not necessarily refer to the same implementation, although they may. Moreover, any use of phrases like "implementations" in connection with "the present application" are never meant to characterize that all implementations of the present application must include the particular feature, structure, or characteristic, and should instead be understood to mean "at least some implementations of the present application" includes the stated particular feature, structure, or characteristic. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of Applications Specific Integrated Circuitry (ASIC), programmable logic arrays, and/or using one or more Digital Signal Processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes hut is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read Only Memory (CD ROM), magnetic cassettes, magnetic tape, magnetic disk storage, or any other equivalent medium capable of storing computer-readable instructions.

A radio communication network architecture (e.g., an LTE system, an LTE-Advanced (LTE-A) system, or an LTE-Advanced Pro system) typically includes at least one BS, at least one UE, and one or more optional network elements that provide connection towards a network. The UE communicates with the network (e.g., a Core Network (CN), an Evolved Packet Core (EPC) network, an Evolved Universal Terrestrial Radio Access Network (E-UTRAN) network, a Next-Generation Core (NGC) network, or an internet) through a Radio Access Network (RAN) established by the BS.

It should be noted that, in the present application, a UE may include, but is not limited to, a mobile station, a mobile terminal or device, a user communication radio terminal, etc. For example, a UE may be a portable radio equipment, which includes, but is not limited to, a mobile phone, a tablet, a wearable device, a sensor, or a Personal Digital Assistant (PDA) with wireless communication capability. The UE is configured to receive/transmit signals over an air interface from/to one or more cells in a radio access network.

A BS may include, but is not limited to, a Node B (NB) as in the UMTS, an evolved Node B (eNB) as in the LTE-A, a Radio Network Controller (RNC) as in the UMTS, a BS Controller (BSC) as in the GSM/GERAN, an NG-eNB as in an E-UTRA BS in connection with the 5GC, a gNB as in the 5G-AN, and any other apparatus capable of controlling radio communication and managing radio resources within a cell. The BS may connect to serve the one or more UEs through a radio interface to the network.

A BS may be configured to provide communication services according to at least one of the following Radio Access Technologies (RATs): Worldwide Interoperability for Microwave Access (WiMAX), Global System for Mobile communications (GSM, often referred to as 2G), GSM EDGE radio access Network (GERAN), General Packet Radio Service (GRPS), Universal Mobile Telecommunication System (UMTS, often referred to as 3G) based on basic Wideband-Code Division Multiple Access (W-CDMA), High-Speed Packet Access (HSPA), LTE, LTE-A, eLTE (evolved LTE), NR (often referred to as 5G), and/or LTE-A Pro. However, the scope of the present application should not be limited to the above mentioned protocols.

The BS is operable to provide radio coverage to a specific geographical area using a plurality of cells forming the radio access network. The BS supports the operations of the cells. Each cell is operable to provide services to at least one UE within its radio coverage. More specifically, each cell (often referred to as a serving cell) provides services to serve one or more UEs within its radio coverage, (e.g., each cell schedules the downlink and optionally uplink resources to at least one UE within its radio coverage for downlink and optionally uplink packet transmissions). The BS can communicate with one or more UEs in the radio communication system through the plurality of cells. A cell may allocate SideLink (SL) resources for supporting Proximity Service (ProSe). Each cell may have overlapped coverage areas with other cells.

As discussed above, the frame structure for NR is to support flexible eon figurations for accommodating various next generation (e.g., 5G) communication requirements, such as enhanced Mobile BroadBand (eMBB), massive Machine Type Communication (mMTC), Ultra-Reliable communication and Low Latency Communication (URLLC), while fulfilling high reliability, high data rate and low latency requirements. The Orthogonal Frequency-Division Multiplexing (OFDM) technology as agreed in Third Generation Partnership Project (3GPP) may serve as a baseline for NR waveform. The scalable OFDM numerology, such as the adaptive sub-carrier spacing, the channel bandwidth, and the Cyclic Prefix (CP), may also be used. Additionally, two coding schemes are considered for NR: (1) Low-Density Parity-Check (LDPC) code and (2) polar code. The coding scheme adaption may be configured based on the channel conditions and/or the service applications.

Moreover, it should be noted that in a transmission time interval TX of a single NR frame, at least DownLink (DL) transmission data, a guard period, and UpLink (UL) transmission data should be included. Additionally, the respective portions of the DL transmission data, the guard period, and the UL transmission data should also be configurable, for example, based on the network dynamics of NR. In addition, SL resource may also be provided in an NR frame to support ProSe services.

In addition, the terms "system" and "network" herein may be used interchangeably. The terra "and/or" herein is only an association relationship for describing associated objects, and represents that three relationships may exist. For example, A and/or B may indicate that: A exists alone. A and B exist at the same time, and B exists alone. In addition, the character "/" herein generally represents that the former and latter associated objects are in an "or" relationship.

In LTE, a System Architecture Evolution-Temporary Mobile Subscriber Identity (S-TMSI) is a temporary UE ID provided by the EPC network. The S-TMSI may be used to uniquely identify a UE within the tracking area. For example, the S-TMSI may be a UE ID with a length of 40 bits, which consists of 8 bits Mobility Management Entity (MME) Code and 32 bits MME-Temporary Mobile Subscriber Identity (M-TMSI). The 40-bit-length S-TMSI may be used for paging a UE Operated in an IDLE state, or may be transmitted in a Message 3 (MSG 3) (e.g., an RRC connection request message) for a contention resolution operation (if a 40-bit random value is not used). On the other hand, the LTE system may support a 56-bit and 72-bit Transport Block (TB) size for the MSG 3 transmission. The 72-bit size may be supported when a path loss condition satisfies the constraint.

In NR, the S-TMSI for 5G (e.g., 5G-S-TMSI) may be extended from 40 bits to 48 bits. The 5G-S-TMSI may be a UE ID with a 48-bit length, which may consist of a 12-bit Access and Mobility Management Function (AMF) set ID, a 4-bit AMF pointer, and a 32-bit 5G-Temporary Mobile Subscriber Identity (5G-TMSI). The AMF set ID may uniquely identify the AMF set within an AMF region. The AMF pointer may uniquely identify the AMF within the AMF set. The 5G-TMSI may be a UE ID that is uniquely identified by a specific AMF (e.g., identified by the AMF set ID and the AMF pointer). Similarly, the 48-bit 5G-S-TMSI may be used for paging a UE operated in the IDLE state, or may be transmitted in an MSG 3 (e.g., an RRC connection request message) for contention resolution (if a 40-bit random value is not used). It should be noted that the MSG 3 may be a message transmitted over an Uplink Shared Channel (UL-SCH) containing a Cell Radio Network Temporary Identifier (C-RNTI) MAC CE, or a Common Control Channel (CCCH) Service Data Unit (SDU) submitted from the upper layer and associated with the UE contention resolution ID. The transmission of MSG 3 may be considered as a part of an RA procedure.

In NR, a new RRC state (i.e., the RRC_INACTIVE state) for the UE is introduced. For a UE operated in the RRC INACTIVE state, the UE may remain in a CM-CONNECTED state and move around in an area configured by a Next Generation-Radio Access Network (NG-RAN) without notifying the NG-RAN. Furthermore, the last serving BS (e.g., a gNB) for the UE operated in the INACTIVE state may keep the UE's context and the UE-associated NG connections to the serving AMF and the User Plane Function (UPF).

On the other hand, an RRC state transition from an INACTIVE state to a CONNECTED state may follow a three-step procedure (e.g. including transmitting an RRC connection resume request message, receiving an RRC connection resume message, and transmitting an RRC connection resume complete message). In some implementations, the RRC connection resume request message may include an Inactive-Radio Network Temporary Identifier (I-RNTI) for the UE context validity check and fetch. The I-RNTI may be allocated by the last serving BS.

It should be noted that the naming of the RRC messages may vary in different versions of the 3GPP technical documents. For example, in some implementations, an RRC connection resume request message may also be referred to as an RRC resume request message; an RRC connection resume message may also be referred to as an RRC resume message; an RRC connection resume complete message may also be referred to as an RRC resume complete message; an RRC connection request message may also be referred to as an RRC connection setup request message/RRC setup request message; an RRC connection setup message may also be referred to as an RRC setup message; and an RRC connection setup complete message may also be referred to as an RRC setup complete message.

FIG. 1 is a schematic diagram illustrating a signaling flow of an RRC state transition process for a UE, in accordance with example implementations of the present disclosure. As shown in FIG. 1, in action 102, the UE 11 may be operating in an RRC_INACTIVE/CM-CONNECTED state. In action 104, the UE 11 may transmit an RRC resume request message (e.g., or an RRC connection resume request message) to the BS 13 (e.g., a gNB) to transition from the RRC_INACTIVE state to an RRC CONNECTED state. In action 106, the BS 13 may send a request message to the last serving BS 15 (e.g., another gNB) to provide the UE context data. In action 108, the last serving BS 13 may provide the UE context data to the BS 13. In action 110, the BS 13 may transmit an RRC resume message (or an RRC connection resume message) to the UE 11. In action 112, the UE 11 may resume the RRC_CONNECTED/CM-CONNECTED state. In action 114, the UE 11 may transmit an RRC resume complete message (or an RRC connection resume complete message) to the BS 13. In action 116, if the loss of DL user data buffered in the last serving BS 15 should be prevented, the BS 13 may transmit a data forwarding address indication to the last serving BS 15.

In actions 118 and 120, the BS 13 may perform a path switch operation for an AMF 17. As shown in FIG. 1, the BS 13 may transmit a path switch request message to the AMF 17 in action 118, and then in action 120, the AMF 17 may reply to the BS 13 with a path switch request response. In action 122, the BS 13 may notify the last serving BS 15 to release the UE context of the UE 11.

During the RRC state transition process shown in FIG. 1, the RRC connection resume request message (e.g., an MSG 3) may carry several Information Elements (IEs). For example, the RRC connection resume request message may include at most 52 bits for an I-RNTI, 16 bits for a resume Message Authentication Code for Integrity (MAC-I), at most 4 bits for a resume cause, at least 8 bits for a MAC sub-header, and a number of bits may be used for the message structure and for spare use. The total size for accommodating the RRC connection resume request message may be 96 bits, which may be much larger than the acceptable TB size (e.g., 56 bits). For example, if the TB size of MSG 3 is larger than 56 bits, the coverage of MSG 3 Physical Uplink Shared Channel (PUSCH) may be reduced, compared to the LTE MSG 3 PUSCH. If a BS receives the MSG 3 out of the coverage of MSG 3 PUSCH, it may be difficult for the BS to successfully decode the MSG 3.

In NR, some of the RRC procedures may face different challenges due to the above-mentioned bit-length issue for the MSG 3. For example, an MSG 3 for an RRC connection request procedure may carry several IEs including at most 48 bits for a 5G-S-TMSI, at most 4 bits for an establish cause, at least 8 bits for a MAC sub-header, and a number of additional bits for the message structure and for spare use. Similarly, for an RRC connection resume request procedure, an MSG 3 may also carry several IEs including at most 52 bits for an I-RNTI, 16 bits for a resume MAC-I, at most 4 bits for a resume cause, at least 8 bits for a MAC sub-header, and a few more bits for the message structure and for spare use.

For both the RRC connection request procedure and the RRC connection resume request procedure, a UE may need to perform a contention-based RA procedure to transition to the CONNECTED state. A contention resolution operation in the RA procedure may be performed based on a UE contention resolution ID on a Downlink Shared Channel (DL-SCH).

If the TB size for MSG 3 is enough to carry the complete UE ID (e.g., a 5G-S-TMSI or an I-RNTI), the MAC entity may address the PDCCH by a Temporary C-RNTI (TC-RNTI) which is included in an RA Response (RAR) message received by a UE. If a MAC Protocol Data Unit (PDU) is successfully decoded and the MAC PDU contains a UE contention resolution ID MAC CE, the MAC entity (or the UE) may consider the contention resolution operation successful and finish the disassembly and de-multiplexing of the MAC PDU, when the UE contention resolution ID in the MAC CE matches the CCCH SDU transmitted in the MSG 3.

From the RRC perspective, in an RRC connection request procedure, the MSG 3 may be an RRC connection request message sent to the BS (e.g., a gNB), the Message 4 (MSG 4) may be an RRC connection setup message sent to the UE, and the Message 5 (MSG 5) may be an RRC connection setup complete message sent to the BS.

Figure 2:
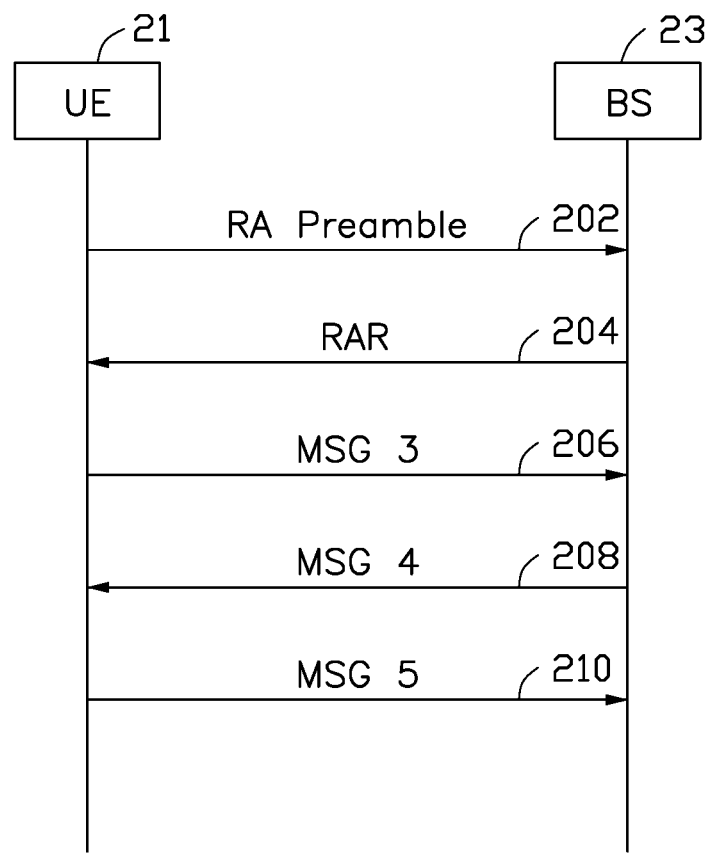
FIG. 2 is a schematic diagram illustrating a signaling flow of an RRC connection request procedure, in accordance with example implementations of the present disclosure.

FIG. 2 is a schematic diagram illustrating a signaling flow of an RRC connection request procedure, in accordance with example implementations of the present disclosure. As shown in FIG. 2, in action 202, a UE 21 may transmit an RA preamble to a BS 23 (e.g., a gNB). In action 204, the BS 23 may reply to the UE 21 with an RAR. The RAR may be a Message 2 (MSG 2) which contains a UL gram for the MSG 3 transmission. In action 206, the UE 21 may transmit an MSG 3 (e.g., an RRC connection request message) to the BS 23 by using the UL grant contained in the MSG 2. In action 208, the UE 21 may receive an MSG 4 (e.g., an RRC connection setup message) from the BS 23. In action 210, the UE 21 may transmit an MSG 5 (e.g., an RRC connection setup complete message) to the BS 23.

On the other hand, in an RRC connection resume request procedure, the MSG 3 may be an RRC connection resume request message sent to a base station (e.g., a gNB), the MSG 4 may be an RRC connection resume message sent to a UE, and the MSG 5 may be an RRC connection resume complete message sent to the base station (if required). The MSG 2 may include a UL grant for the MSG 3 transmission.

Some technical issues may arise if the TB size for the MSG 3 is not enough to carry the complete UE ID (e.g., a 5G-S-TMSI or an I-RNTI). For example, from the contention resolution perspective, the collision possibility for contention resolution may increase if the TB size for MSG 3 is not enough to carry the complete UE ID. In addition, regarding the UE context fetch, a BS may need a complete UE ID (e.g., an I-RNTI) to locate the last serving BS of a UE operated in an INACTIVE state, and verify whether the stored UE context is valid or not. Furthermore, for an RRC connection resume request procedure, a BS may need a complete UE ID (e.g., an I-RNTI) before sending the MSG 4. If the BS fails to retrieve and verify the UE context, it may take more time for the UE to transition from the INACTIVE state back to the CONNECTED state. For example, if the BS uses an I-RNTI with a short bit length (e.g., less than 52 bits) for a UE context retrieval, the failure rate of the UE context retrieval may be increased because some UEs may correspond to the same I-RNTI.

In some implementations, if the TB size for MSG 3 is not enough to carry a complete UE ID, segmenting the UE ID may be a solution. For example, a UE may segment the UE ID into two parts: a UE ID part 1 and a UE ID part 2, according to predefined rules and/or configurations from the Network (NW). Then, the UE may transmit the UE ID part 1 in a first message and then transmit the UE ID part 2 in a second message. The type/format of first message and the second message may depend on what procedure the UE performs.

In some implementations, since a contention-based RA procedure may be applied in both an RRC connection request procedure and an RRC connection resume request procedure, the BS may apply certain mechanism(s) to indicate to a UE, which has received the BS's response (e.g., an MSG 4) for MSG 3, whether to transmit the UE ID part 2, or consider the BS's response for MSG 3 as a NW message (e.g., an RRC connection setup message or an RRC connection resume message). In some of such implementations, a UE may receive an MAC CE from a BS, and the MAC CE may contain a bit field configured to indicate to the UE to transmit the second part of the UE ID.

In some implementations, the UL grants for the UE ID part 1 transmission and the UE ID part 2 transmission may be provided by an RAR and an MSG4, respectively. In some other implementations, the UL grants for both the UE ID part 1 transmission and the UE ID part 2 transmission may be provided by the RAR, where the following two options may be applied:

Option 1: A new RAR format may be introduced. The new RAR format may include two separate UL grants for the UE ID part 1 transmission and the UE ID part 2 transmission, respectively. The UE may know the UL grant sizes for the UE ID part 1 transmission and the UE ID part 2 transmission by the ascending/descending order of the UL grants in the RAR. For example, in some implementations, a UE may receive an RAR including a first UL grant and a second UL grant from a BS, and transmit the UE ID part 1 and the UE ID part 2 based on the first UL grant and the second UL grant, respectively.

Option 2: An existing RAR format may be reused. The UL grant size and allocation may be repeated with a predefined time offset (e.g., M symbols). After receiving the RAR, a UE may transmit the UE ID part 1 and the UE ID part 2 via respective resources. For example, in some implementations, the UE may receive an RAR including a UL grant indicating a first resource allocation (e.g., a set of resource blocks) from the BS. The UE may then transmit the UE ID part 1 to the BS based on the first resource allocation, and derive a second resource allocation from the first resource allocation by shifting the first resource allocation in time domain (e.g., by shifting the first resource allocation M symbols in time domain). After that, the UE may transmit the UE ID part 2 to the BS based on the second resource allocation.

According to various implementations of the present disclosure, an improved mechanism for transmitting the UE identification information (e.g., a UE ID) during certain procedure(s) (e.g., an RA procedure) is provided. Example implementations of the improved mechanism are next described.

Case 1-1

Figure 3:
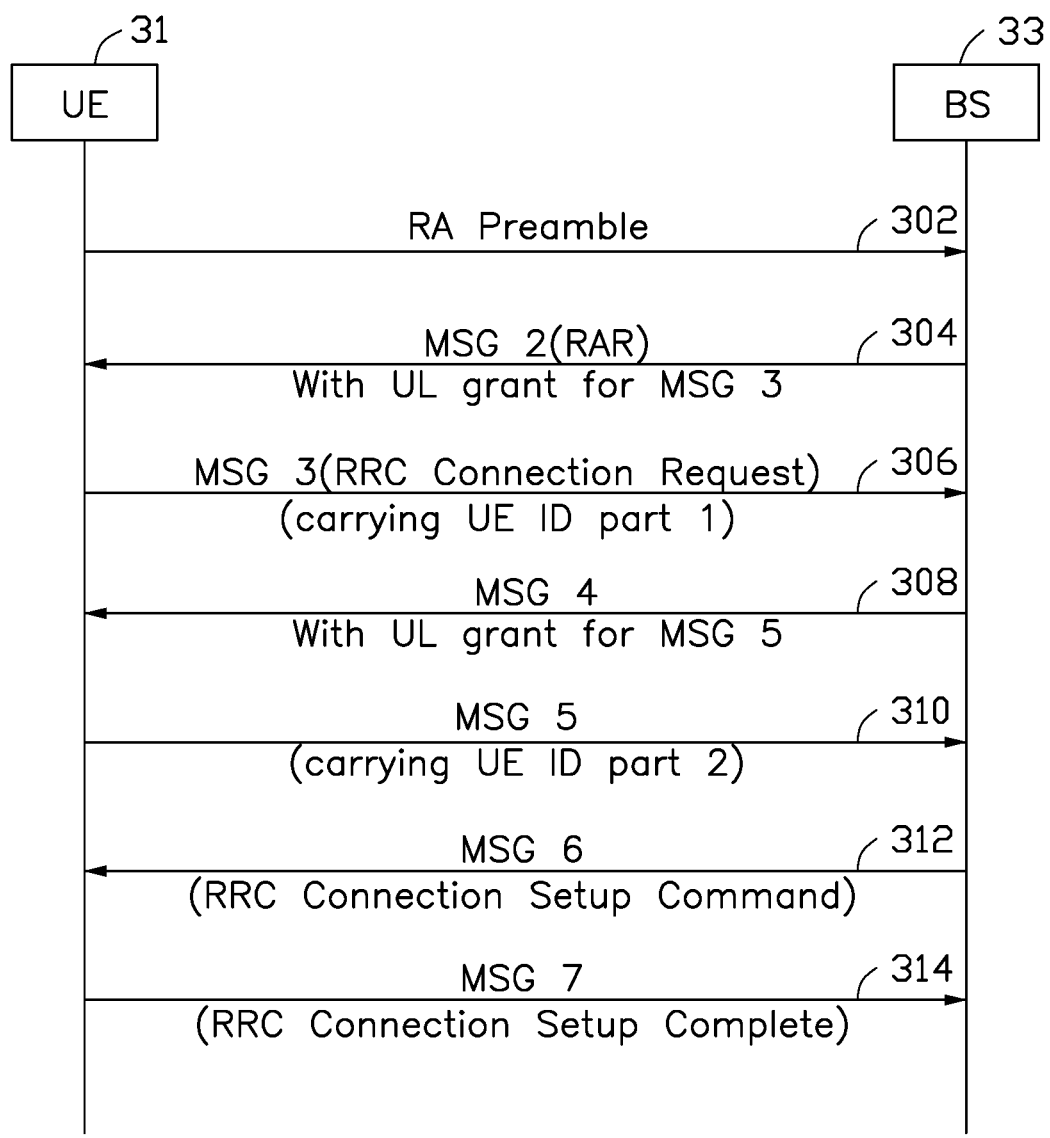
FIG. 3 is a schematic diagram illustrating a signaling flow of an RRC procedure, in accordance with example implementations of the present disclosure.

FIG. 3 is a schematic diagram illustrating a signaling flow of an RRC procedure (e.g., an RRC connection request procedure), in accordance with example implementations of the present disclosure. As shown in FIG. 3, the signaling flow includes actions 302, 304, 306, 308, 310, 312 and 314.

In action 302, a UE 31 may transmit an RA preamble to a BS 33 (e.g., a gNB).

In action 304, the BS 33 may reply to the UE 31 with an MSG 2 (e.g., an RAR). The RAR may include a UL grant for an MSG 3 transmission.

Given that a complete UE ID of the UE 31 is divided into two parts (e.g., a UE ID part 1 and a UE ID part 2), in action 306, the UE 31 may transmit an MSG 3 (e.g., an RRC connection resume request message) carrying the UE ID part 1 to the BS 33.

In action 308, the BS 33 may transmit an MSG 4 (e.g., an RAR) including another UL grant for an MSG 5 transmission to the UE 31.

In action 310, the UE 31 may transmit an MSG 5 carrying the UE ID part 2 to the BS 33 based on the UL grant included in the MSG 4.

In action 312, the BS 33 may transmit an MSG 6 (e.g., an RRC connection setup message) to the UE 31.

In action 314, the UE 31 may transmit an MSG 7 (e.g., an RRC connection setup complete message) to the BS 33.

In the present implementation, a UE (e.g., the UE 31) may send the complete UE ID to a BS (e.g., the BS 33) before receiving the RRC connection setup message, so that the collision possibility for contention resolution is reduced. Specifically, the UE may transmit UE ID part 1 in the MSG 3 and then transmit the UE ID part 2 in the MSG 5. Then, for the MSG 6 reception at the UE side, if the MAC PDU is successfully decoded by the UE and the MAC PDU contains a UE contention resolution ID MAC CE, the MAC entity (or the UE) may consider the contention resolution successful and then finish the disassembly and de-multiplexing of the MAC PDU when the UE contention resolution ID in the UE contention resolution ID MAC CE matches a combination of the UE ID part 1 and the UE ID part 2 (e.g., the first X1 bits of the CCCH SDU transmitted in the MSG 3 and the first Y1 bits of the CCCH SDU transmitted in the MSG 5).

In some implementations, the UE contention resolution ID MAC CE may be identified by a MAC PDU sub-header with a predefined Logical Channel ID (LCID). The UE contention resolution ID MAC CE may have a fixed size (e.g., Z1 bytes). The parameters X1, Y1 and Z1 may have predefined values or configurable values.

In Case 1-1, since the RRC entity at the BS side (e.g., the BS 33) may receive the RRC connection request message from the UE (e.g., the UE 31), the RRC entity may know the received MSG 3 is used for an RRC connection request procedure. Then, the BS may transmit the MSG 4 as a response (e.g., an RAR) to indicate to the UE to transmit the UE ID part 2 in the next message (e.g., the MSG 5), instead of transmitting an RRC connection setup message. The UE's MAC entity may address the PDCCH by a TC-RNTI which is received by the UE in MSG4.

In some other implementations, the MSG 3 may include a bit (e.g., a spare bit) to explicitly indicate whether the MSG 3 is used as an RRC connection resume request message or not. For example, if the bit is set to "0", the BS may know that the received MSG 3 is used as an RRC connection request message (or other non-RRC connection resume request message(s)). Otherwise (e.g., if the bit is set to "1"), the BS may know that the received MSG 3 is used as an RRC connection resume request message.

Case 1-1-1

In Case 1-1-1, the contention resolution may include two stages. In some implementations, the contention resolution may be considered to be successful only if both the stage-one contention resolution and the stage-two contention resolution are successful. For example, at first, similar to Case 1-1, a UE may transmit the UE ID part 1 in the MSG 3. Then, if an MAC PDU in the MSG 4 is successfully decoded by the UE and the MAC PDU contains a UE contention resolution ID MAC CE, the MAC entity (or the UE) may consider the stage-one contention resolution successful and wait for the stage-two contention resolution when the UE contention resolution ID in the UE contention resolution ID MAC CE matches the first X1 bits of the CCCH SDU transmitted in the MSG 3. When the stage-one contention resolution is successful, the UE may then transmit the UE ID part 2 in the MSG 5. Then, for the MSG 6 reception at the UE side, if the MAC PDU is successfully decoded by the UE and the MAC PDU contains a UE contention resolution ID MAC CE, the MAC entity (or the UE) may consider the stage-two contention resolution successful when the UE contention resolution ID in the UE contention resolution ID MAC CE matches the first Y1 bits of the CCCH SDU transmitted in the MSG 5. On the other hand, if the stage-one contention resolution or the stage-two contention resolution fails, the UE's MAC entity may perform an RA resource selection procedure to try again (e.g., transmitting a new RA preamble). If the number of RA preamble transmissions exceeds a configured and/or predefined number, the UE's MAC entity may notify the upper layer of an RA problem.

Case 1-1-2

In Case 1-1-2, a BS (e.g., a gNB) may assign dedicated RA resource(s) to a UE. The UE may use the dedicated RA resource(s) to ask for a UL grant to transmit the UE ID part 2, if the stage-two contention resolution fails. The contention resolution is considered successful only if both the stage-one contention resolution and the stage-two contention resolution are successful. If the stage-one contention resolution fails, the UE's MAC entity may perform an RA resource selection procedure to try again (e.g., transmitting a new RA preamble). On the other hand, if the stage-two contention resolution fails, the UE's MAC entity may use the assigned dedicated RA resource(s) to transmit a new RA preamble to the BS to ask for a UL grant to transmit the UE ID part 2. In some implementations, if the number of RA preamble transmissions on the dedicated RA resources exceeds a configured number, the UE's MAC entity may perform an RA resource selection procedure (e.g., transmitting a new RA preamble) to try again, without using the dedicated RA resources.

Case 1-1-3

In Case 1-1-3, the contention resolution is successful only if both the stage-one contention resolution and the stage-two contention resolution are successful. If the stage-one contention resolution fails, the UE's MAC entity may perform an RA resource selection procedure to try again (e.g., transmitting a new RA preamble). If the number of RA preamble transmissions exceeds a configured number, the UE's MAC entity may indicate an RA problem to the upper layer. If the stage-one contention resolution is successful, the UE may perform the stage-two contention resolution. Specifically, if the stage-two contention resolution fails, the UE's MAC entity may perform an RA resource selection procedure to retry only the stage-two contention resolution (not starting from retrying the stage-one contention resolution). In some implementations, if the number of RA preamble transmissions exceeds a configured/predefined number, the UE's MAC entity may notify the upper layer of an RA problem.

Case 1-2

As mentioned above, the RRC entity at the BS side may know whether the received MSG 3 is for an RRC connection request procedure. In some implementations, if the BS does not need the UE ID part 2 for contention resolution, the BS may transmit an MSG 4 (e.g., an RRC connection setup message) as a response for the MSG 3. Then, the UE may transmit an MSG 5 (e.g., an RRC connection setup complete message or other RRC message(s)) carrying the UE ID part 2 after receiving the MSG 4. In some implementations, whether and/or when the UE transmits the UE ID part 2 may be mandatory in a specific RRC message or may be determined by a request message from the BS.

Figure 4:
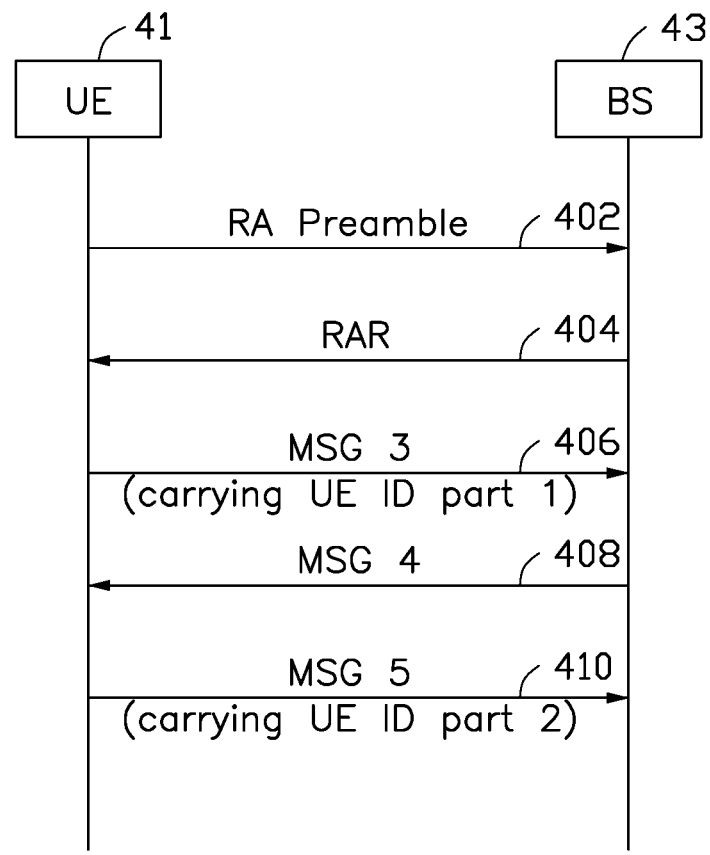
FIG. 4 is a schematic diagram illustrating a signaling flow of an RRC procedure, in accordance with example implementations of the present disclosure.

FIG. 4 is a schematic diagram illustrating a signaling flow of an RRC procedure, in accordance with example implementations of the present disclosure. As shown in FIG. 4, the signaling flow includes actions 402, 404, 406, 408 and 410.

In action 402, a UE 41 may transmit an RA preamble to a BS 43 (e.g., a gNB).

In action 404, the BS 43 may reply to the UE 41 with an MSG 2 (e.g., an RAR). The RAR may include a UL grant for an MSG 3 transmission.

Given that a complete UE ID of the UE 41 may be divided into two parts (e.g., a UE ID part 1 and a UE ID part 2), in action 406, the UE 41 may transmit an MSG 3 carrying the UE ID part 1 to the BS 43.

In action 408, the BS 43 may transmit an MSG 4 as a response to the UE 41.

In action 410, the UE 41 may transmit the remaining part of the UE ID (i.e., the UE ID part 2) to the BS 43 via an MSG 5.

In the present implementation, a UE (e.g., the UE 41) may transmit the UE ID part 1 in the MSG 3 and then transmit the UE ID part 2 in the MSG 5. For the MSG 4 reception at the UE side, if an MAC PDU is successfully decoded by the UE and the MAC PDU contains a UE contention resolution ID MAC CE, the MAC entity (or the UE) may consider the contention resolution successful and finish the disassembly and de-multiplexing of the MAC PDU when the UE contention resolution ID MAC CE matches the first X2 bits of the CCCH SDU transmitted in the MSG 3. Specifically, the BS (e.g., the BS 43) may obtain the complete UE ID after the contention-based RA procedure is completed. In some implementations, the UE contention resolution ID MAC CE may be identified by an MAC PDU sub-header with a pre-defined LCID. The UE contention resolution ID MAC CE may have a fixed size (e.g., Z2 bytes). In some implementations, the parameter X2 may be different from X1, and the parameter Z2 may be different from Z1.

Case 2

Figure 5:
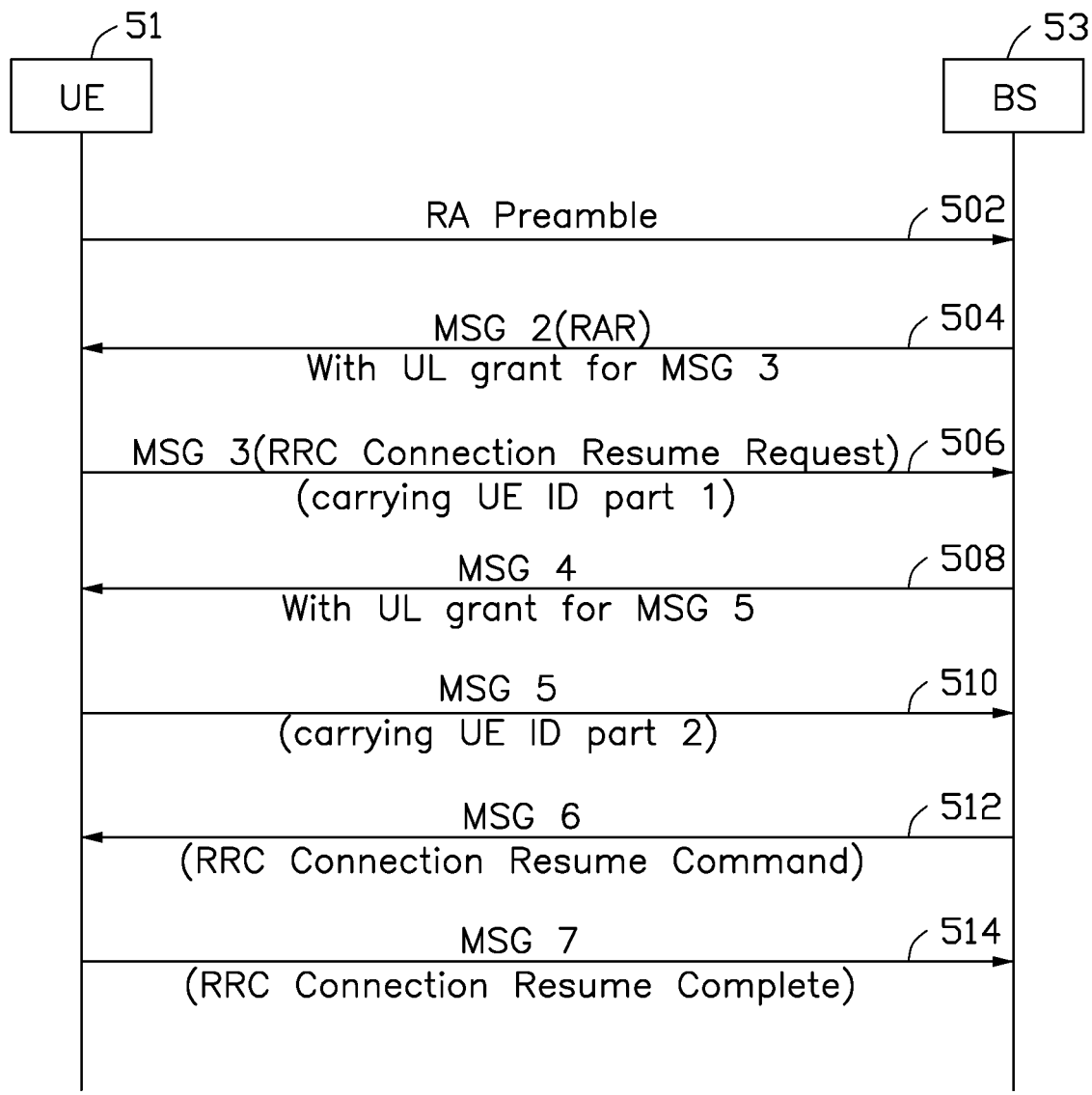
FIG. 5 is a schematic diagram illustrating a signaling flow of an RRC procedure, in accordance with example implementations of the present disclosure.

FIG. 5 is a schematic diagram illustrating a signaling flow of an RRC procedure, in Accordance with example implementations of the present disclosure. As shown in FIG. 5, the signaling flow includes actions 502, 504, 506, 508, 510, 512 and 514.

In action 502, a UE 51 may transmit an RA preamble to a BS 53 (e.g., a gNB).

In action 504, the BS 53 may transmit an MSG 2 as a response (e.g., an RAR) to the UE 51. The RAR may include a UL grant for an MSG 3 transmission.

Given that a complete UE ID of the UE 51 is divided into two parts (e.g., a UE ID part 1 and a UE ID part 2), in action 506, the UE 51 may transmit an MSG 3 (e.g., an RRC connection resume request message) carrying the UE ID part 1 to the BS 53.

In action 508, the BS 53 may transmit an MSG 4 (e.g., an RAR) as a response to the UE 51. The MSG 4 may include a UL grant for an MSG 5 transmission.

In action 510, the UE 51 may transmit an MSG 5 carrying the UE ID part 2 to the BS 53.

In action 512, the BS 53 may transmit a Message 6 (MSG 6) as a response (e.g., an RRC connection resume message) to the UE 51.

In action 514, the UE 51 may transmit a Message 7 (MSG 7) (e.g., an RRC connection resume complete message) to the BS 53.

In the present implementation, for an RRC connection resume request procedure (or other RRC procedure)s)), the BS (e.g., the BS 53) may obtain the complete UE ID (e.g., both of the UE ID part 1 and the UE ID part 2) before the transmission of MSG 6 (e.g., an RRC connection setup message), and then the BS may use the complete UE ID to retrieve and verify the UE context with the other NW entity(s). As shown in FIG. 5, the UE 51 may transmit the UE ID part 1 in the MSG 3 and then transmit the UE ID part 2 in the MSG 5. Then, if an MAC PDU in the MSG 6 is successfully decoded by the UE 51 and the MAC PDU contains a UE contention resolution ID MAC CE, the MAC entity (or the UE 51) may consider the contention resolution successful and finish the disassembly and de-multiplexing of the MAC PDU when the UE contention resolution ID in the UE contention resolution ID MAC CE matches the first X3 bits of the CCCH SDU transmitted in the MSG 3 and the first Y3 bits of the CCCH SDU transmitted in the MSG 5. In some implementations, the UE contention resolution ID MAC CE may be identified by an MAC PDU sub-header with a pre-defined LCID. The UE contention resolution ID MAC CE may have a fixed size (e.g., Z3 bytes). The parameters, X3, Y3, and Z3, may have predefined values or configurable values. In some implementations, the parameter X3 may be different from X1, the parameter Y3 may be different from Y1, and the parameter Z3 may be different from Z1.

In Case 2, the RRC entity of the BS (e.g., the BS 53) may know the received MSG 3 is for an RRC connection resume request procedure because the MSG 3 is an RRC connection resume request message. Then, the BS may transmit an MSG 4 as a response to ask the UE (e.g., the UE 51) to transmit the UE ID part 2 in the next message, instead of sending back an RRC connection resume message. The UE's MAC entity may address a PDCCH by a TC-RNTI which is received by the UE in the MSG4.

In some other implementations, the MSG 3 may include a bit (e.g., a spare bit) to explicitly indicate whether the MSG 3 is used as an RRC connection resume request message or not. For example, if the bit is set to "0," the BS may know that the received MSG 3 is used as an RRC connection request message (or other non-RRC connection resume request message(s)). Otherwise (e.g., if the bit is set to "1"), the BS may know that the received MSG 3 is used as an RRC connection resume request message.

Case 2-1

In Case 2-1, the contention resolution may include two stages. A UE may transmit the UE ID part 1 in the MSG 3. Then, if a MAC PDU is successfully decoded by the UE and the MAC PDU contains a UE contention resolution ID MAC CE, the MAC entity (or the UE) may consider the stage-one contention resolution successful, when the UE contention resolution ID in the UE contention resolution ID MAC CE matches the first X3 bits of the CCCH SDU transmitted in the MSG 3.

The UE may perform the stage-two contention resolution when the stage-one contention resolution is successful. For example, after the stage-one contention resolution is considered to be successful, the UE may then transmit the UE ID part 2 in the MSG 5. If an MAC PDU in the MSG 6 is successfully decoded by the UE and the MAC PDU contains a UE contention resolution ID MAC CE, the MAC entity (or the UE) may consider the stage-two contention resolution successful when the UE contention resolution ID in the UE contention resolution ID MAC CE matches the first Y3 bits of the CCCH SDU transmitted in the MSG 5.

In Case 2-1, the contention resolution is considered to be successful only if both the stage-one contention resolution and the stage-two contention resolution are successful. If the stage-one contention resolution or the stage-two contention resolution fails, the UE's MAC entity may perform an RA resource selection procedure to try again (e.g., transmitting a new RA preamble). In some implementations, if the number of RA preamble transmissions exceeds a configured number, the UE's MAC entity may notify the upper layer of an RA problem.

Case 2-2

In Case 2-2, a BS (e.g., a gNB) may assign dedicated RA resource(s) to a UE. The UE may use the dedicated RA resource(s) to ask for a UL grant to transmit the UE ID part 2 if the stage-two contention resolution fails. The contention resolution may be considered successful only if both the stage-one contention resolution and the stage-two contention resolution are successful. If the stage-one contention resolution fails, the UE's MAC entity may perform an RA resource selection procedure to try again (e.g., transmitting a new RA preamble). On the other hand, if the stage-two contention resolution fails, the UE's MAC entity may use the assigned dedicated R A resource(s) to transmit a new RA preamble to the BS to ask for a UL grant to transmit the UE ID part 2. In some implementations, if the number of RA preamble transmissions on the dedicated RA resources exceeds a configured number, the UE's MAC entity may perform an RA resource selection procedure (e.g., transmitting a new RA preamble) to try again, without using the dedicated RA resources.

Case 2-3

In Case 2-3, the contention resolution is successful only if both the stage-one contention resolution and the stage-two contention resolution are successful. If the stage-one contention resolution fails, the UE's MAC entity may perform an RA resource selection procedure to try again (e.g., transmitting a new RA preamble). If the number of RA preamble transmissions exceeds a configured number, the UE's MAC entity may indicate an RA problem to the upper layer. If the stage-one contention resolution is successful, the UE may perform the stage-two contention resolution. Specifically, if the stage-two contention resolution fails, the UE's MAC entity may perform an RA resource selection procedure to retry only the stage-two contention resolution (not starting from retrying the stage-one contention resolution). In some implementations, if the number of RA preamble transmissions exceeds the configured number, the UE's MAC entity may notify the upper layer of an RA problem.

Case 3

Figure 6:
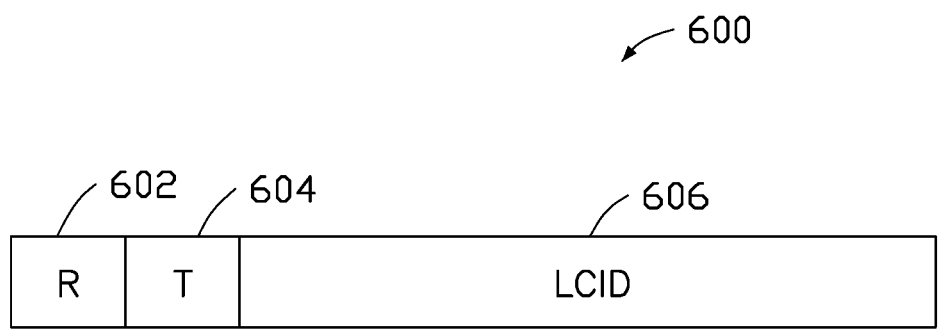
FIG. 6 is a schematic diagram illustrating a sub-header format of a Medium Access Control (MAC) Control Element (CE), in accordance with example implementations of the present disclosure.

In some implementations, the UE contention resolution ID MAC CE may have a fixed size with a sub-header, an example format of which is shown in FIG. 6.

FIG. 6 is a schematic diagram illustrating a sub-header format of a MAC CE (e.g., a UE contention resolution ID MAC CE), in accordance with example implementations of the present disclosure. In the present implementation, the sub-header of the MAC CE may be configured with, but not limited to, a predefined LCID to indicate a CCCH and only one MAC sub PDU in the MAC PDU. As shown in FIG. 6, the sub-header 600 of the UE contention resolution ID MAC CE may include an R field 602, a T field 604 and an LCID field 606. The R field 602 may contain reserved bit(s) which may be set to zero in some implementations. The T field 604 may be configured to indicate whether the UE ID part 2 is required to be sent before a BS (e.g., a gNB) receives a NW message (e.g., an RRC connection request message or an RRC connection resume request message). The LCID field 606 may be used for identifying the logical channel instance of the corresponding MAC SDU or the type of the corresponding MAC CE, or padding for a DL-SCH and a UL-SCH, respectively. In some implementations, each MAC sub-header (e.g., the sub-header 600) may have one LCID field (e.g., the LCID field 606). In some implementations, the LCID field size may be 6 bits, while in other implementations the LCID field size may have a different number of bits.

In some implementations, for an RRC connection request procedure, a BS (e.g., a gNB) may transmit an MSG 4 to a UE to ask the UE to transmit the UE ID part 2 in the next message, instead of transmitting an RRC connection setup message. In some of such implementations, the T field 604 of the sub-header 600 of the UE contention resolution ID MAC CE may be set to "0" to inform the UE that the procedure introduced in, e.g., Case 1-1, is applied. On the contrary, if the BS does not need the UE ID part 2 for contention resolution, the BS may transmit an RRC connection setup message via the MSG 4. Then, the UE may transmit the UE ID part 2 via. e.g., an RRC connection setup complete message or other RRC message(s), after receiving the RRC connection setup message from the BS. In such a case, the T field 604 may be set to "1" to inform the UE that the procedure introduced in, e.g., Case 1-2, is applied.

In some implementations, for an RRC connection resume request procedure, a BS (e.g., a gNB) may transmit an MSG 4, as response, to ask the UE to transmit the UE ID part 2 in the next message, instead of transmitting an RRC connection resume message. In some of such implementations, the T field (e.g., the T field 604) of the sub-header (e.g., the sub-header 600) of the UE contention resolution ID MAC CE may be set to "0" to indicate to the UE that the procedure introduced in, e.g., Case 1-1, is applied.

Case 3-1

In Case 3-1, there is no predefined LCID for a CCCH indicating only one MAC sub PDU in the MAC PDU, and there is no predefined LCID for a CCCH indicating more than one MAC sub PDU in the MAC PDU. Instead, a single LCID for both scenarios may be used. In some implementations, a P field may be introduced to indicate whether an L field is present or not. The L field may be used to indicate the length of the corresponding MAC SDU or variable-sized MAC CE in bytes. In some implementations, if a CCCH indicates only one MAC sub PDU in the MAC PDU, the P field (if only one bit is included) may be set to "0" to indicate that the L field is not present in the sub-header of the MAC CE, otherwise (e.g., if the bit of the P field is set to "1"), the L field may be present in the sub-header of the MAC CE, as shown in FIGS. 7 and 8.

Figure 7:
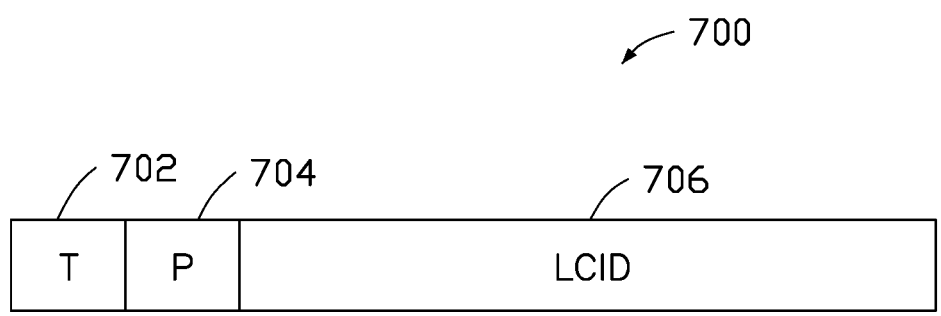
FIG. 7 is a schematic diagram illustrating a sub-header format of a MAC CE, in accordance with example implementations of the present disclosure.

FIG. 7 is a schematic diagram illustrating a sub-header format of a MAC CE (e.g., a UE contention resolution ID MAC CE), in accordance with example implementations of the present disclosure. As shown in FIG. 7, the sub-header 700 may include a T field 702, a P field 704 and an LCID field 706. In the present implementation, because the bit value of the P field 704 may be set to "0," the sub-header 700 does not include an L field.

Figure 8:
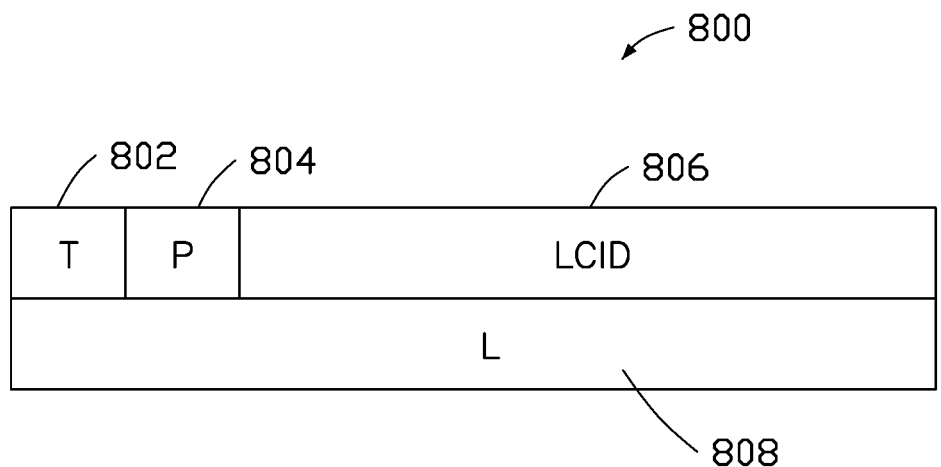
FIG. 8 is a schematic diagram illustrating a sub-header format of a MAC CE, in accordance with example implementations of the present disclosure.

FIG. 8 is a schematic diagram illustrating a sub-header format of a MAC CE (e.g., a UE contention resolution ID MAC CE), in accordance with example implementations of the present disclosure. As shown in FIG. 8, the sub-header 800 may include a T field 802, a P field 804 and an LCID field 806. In the present implementation, because the bit value of the P field 704 may be set to "1," the sub-header 800 may further include an L field 808 (e.g., an 8-bit field).

Case 3-2

In Case 3-2, a sub-header format of a MAC CE (e.g., a UE contention resolution ID MAC CE) may not include a T field. In some implementations, the T field may be replaced by an R Field.

Case 4 (Message Harmonization)

For an RRC connection resume request procedure, an original MSG 3 may include several IEs including at most 52 bits for an I-RNTI, 16 bits for a resume MAC-I, at most 4 bits for a resume cause, at least 8 bits for an MAC sub-header and a few additional bits for the message structure and for spare use. If the TB size for the MSG 3 is not enough, separating the IEs for two RRC messages may become an issue.

Taking FIG. 5 as an example, for an RRC connection resume request procedure (or other RRC procedure(s)), a UE (e.g., the UE 31) may transmit the UE ID part 1 in the MSG 3 and then transmit the UE ID part 2 in the MSG 5. Considering the harmonization of the RRC connection request message(s), in some implementations, the MSG 3 may carry several IEs, such as the UE ID part 1, a resume cause/establishment cause, and an MAC sub-header. In some implementations, an RRC message transmitted via the MSG 3 may include at least one bit to explicitly indicate whether the RRC message is used as an RRC connection resume request message. On the other hand, the MSG 5 may include IEs, such as the UE ID part 2, an MAC sub-header, and a short MAC-I. In some implementations, an RRC message transmitted via the MSG 5 may include at least one bit to explicitly indicate whether the RRC message is used as an RRC connection resume request message.

Similarly, referring back to FIG. 3, for an RRC connection request procedure, a UE (e.g., the UE 31) may transmit the UE ID part 1 in the MSG 3 and then transmit the UE ID part 2 in the MSG 5. Considering the harmonization of the RRC connection request message(s), the MSG 3 may include IEs, such as the UE ID part 1, a resume cause/establishment cause, and an MAC sub-header. In some implementations, an RRC message transmitted via the MSG 3 may include at least one bit to explicitly indicate whether the RRC message is used as an RRC connection resume request message. On the other hand, an RRC message transmitted via the MSG 5 may include at least one bit to explicitly indicate whether the RRC message is used as an RRC connection resume request message.

In some implementations, the UE ID part 2 may be the remaining information bits, which are not appeared in the UE ID part 1, in the complete UE ID. In some other implementations, the UE ID part 2 may be the complete UE ID information bits. In such a case, the UE ID part 1 is a subset of the UE ID part 2. In some other implementations, the UE ID part 1 may represent Network Slice Selection Assistance Information (NSSAI), and the UE ID part 2 may represent the information bit(s) of the complete UE ID. In some other implementations, the UE ID part 1 may represent an S-TMSI adopted in an EPC network, and the UE ID part 2 may represent the 5G-S-TMSI in a 5GC network.

Case 5 (Fall Back Mechanism)

As discussed above, as the TB size for the MSG 3 transmission increases, the coverage of the MSG 3 PUSCH may probably be reduced. But if the radio quality or the NW condition is good enough, in some implementations, it may be possible to provide a larger TB size for the MSG 3 transmission.

In some implementations, for an RRC connection request procedure or an RRC connection resume request procedure, a UE may transmit an MSG 3 containing all the required information (e.g., including the complete UE ID) if the UL grants is sufficient for the transmission. If the MSG 3 (including the complete UE ID) transmission fails, the UE may fall back to transmitting another MSG 3 containing only part(s) (e.g., including the UE ID part 1 only) of the required information. In some implementations, the NW may configure two values for a content-based RA procedure: the first value may be used to indicate a maximum number K1 of RA preamble transmissions for a complete UE ID transmission. The second value may be used to indicate a maximum number K2 of the RA preamble transmissions for a segmented UE ID transmission (e.g., transmitting the UE ID part 1 first, and then transmitting the UE ID part 2). In some implementations, the UE may transmit the segmented UE ID (e.g., the UE ID part 1 and the UE ID part 2) based on the mechanism of Case 1-1, 1-1-1, 1-1-2, 1-1-3, 1-2, or 2 and the related implementations. For example, a UE may transmit an RA preamble to a BS to ask for a larger UL grant to transmit an MSG 3 containing all the required information (e.g., including the complete UE ID). If the RA preamble transmission counter exceeds K1, the UE may then perform an RA resource selection procedure to transmit another RA preamble to ask for a smaller UL grant to transmit an MSG 3. If the RA preamble transmission counter exceeds K2, the UE's MAC entity may notify the upper layer of an RA problem.

In some other implementations, the NW may configure two values for a content-based RA procedure: the first value may indicate a maximum number K1 of RA preamble transmissions for a complete UE ID transmission, and the second value may indicate a maximum number K3 of RA preamble transmissions in an RA procedure.

In some other implementations, depending on the preamble group selected by the UE for the Message 1 (MSG 1) transmission, it may be implicitly linked to which UE ID (a complete UE ID or a segmented UE ID) the UE is likely to transmit in the MSG 3. On the other hand, a BS (e.g., a gNB) may adjust the UL grant size based on the received signal strength of the MSG 1. According to the UL grant size indicated in an RAR, the UE may be indicated to transmit a complete UE ID or a segmented UE ID.

Figure 9:
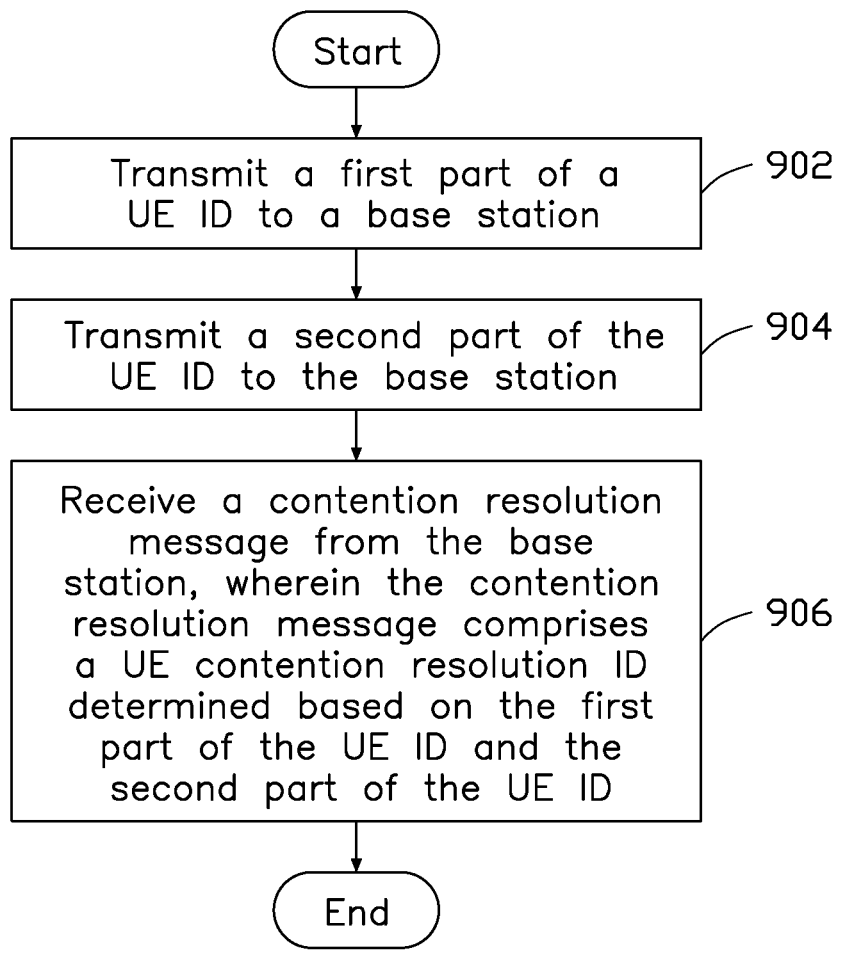
FIG. 9 is a flowchart for a method of transmitting the identification information of a UE during an RA procedure, in accordance with example implementations of the present disclosure.

FIG. 9 is a flowchart for a method of transmitting the identification information of a UE during an RA procedure, in accordance with example implementations of the present disclosure. As shown in FIG. 9, the flowchart includes actions 902, 904 and 906.

In action 902, the UE may transmit a first part (e.g., the UE ID part 1) of a UE ID to a BS (e.g., a gNB).

In action 904, the UE may transmit a second part (e.g., the UE ID part 2) of the UE ID to the BS. In some implementations, the UE may receive an RAR including a UL grant from the BS, and segment the UE ID when the UL grant is insufficient to transmit the UE ID.

In action 906, the UE may receive a contention resolution message (e.g., a UE contention resolution ID MAC CE) from the BS. The contention resolution message may include a UE contention resolution ID determined based on the first part of the UE ID and the second part of the UE ID.

In some implementations, the first part of the UE ID and the second part of the UE ID may be transmitted in separate CCCH SDUs. For example, the first part of the UE ID may be transmitted in a first CCCH SDU, and the second part of the UE ID may be transmitted in a second CCCH SDU. In some of such implementations, the UE contention resolution ID may include the first CCCH SDU and the second CCCH SDU. In some other implementations, the UE contention resolution ID may include a portion of the first CCCH SDU and a portion of the second CCCH SDU. For example, if the bit length of the first part of the UE ID is K1 and the bit length of the second part of the UE ID is K2, the UE contention resolution ID may consist of the first k1 bits of the first part of the UE ID and the first k2 bits of the second part of the UE ID, where k1 is less than K1, and k2 is less than K2. In some other implementations, the UE contention resolution ID may be represented by the first CCCH SDU. In such a case, the UE contention resolution ID may not include the second part of the UE ID.

Figure 10:
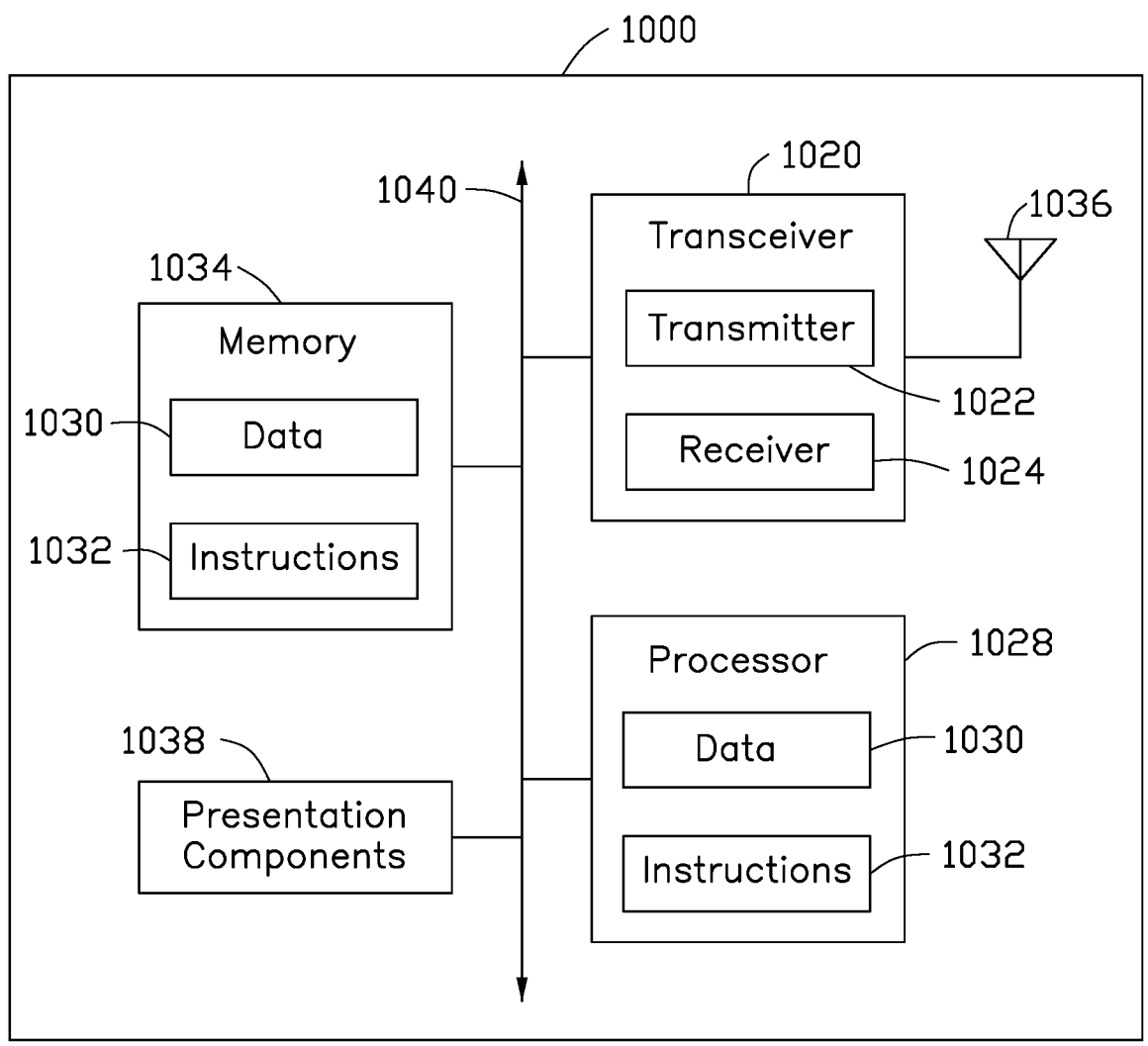
FIG. 10 is a block diagram illustrating a node for wireless communication, in accordance with various aspects of the present application.

FIG. 10 is a block diagram illustrating a runic for wireless communication, in accordance with various aspects of the present application. As shown in FIG. 10, a node 1000 may include a transceiver 1020, a processor 1028, a memory 1034, one or more presentation components 1038, and at least one antenna 1036. The node 1000 may also include an RF spectrum band module, a BS communications module, a network communications module, and a system communications management module. Input/Output (I/O) ports, I/O components, and power supply (not explicitly shown in FIG. 10). Each of these components may be in communication with each other, directly or indirectly, over one or more buses 1040. In one implementation, the node 1000 may be a UE or a BS that performs various functions described herein, for example, with reference to FIGS. 1 through 9.

The transceiver 1020 having a transmitter 1022 (e.g., transmitting/transmission circuitry) and a receiver 1024 (e.g., receiving/reception circuitry) may be configured to transmit and/or receive time and/or frequency resource partitioning information. In some implementations, the transceiver 1020 may be configured to transmit in different types of subframes and slots including, but not limited to, usable, non-usable and flexibly usable subframes and slot formats. The transceiver 1020 may be configured to receive data and control channels.

The node 1000 may include a variety of computer-readable media. Computer-readable media can be any available media that can be accessed by the node 1000 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable.

Computer storage media includes RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 1034 may include computer-storage media in the form of volatile and/or non-volatile memory. The memory 1034 may be removable, non-removable, or a combination thereof. Exemplary memory includes solid-state memory, hard drives, optical-disc drives, and etc. As illustrated in FIG. 10, The memory 1034 may store computer-read able, computer-executable instructions 1032 (e.g., software codes) that are configured to, when executed, cause the processor 1028 to perform various functions described herein, for example, with reference to FIGS. 1 through 9. Alternatively, the instructions 1032 may not be directly executable by the processor 1028 but be configured to cause the node 1000 (e.g., when compiled and executed) to perform various functions described herein.

The processor 1028 (e.g., having processing circuitry) may include an intelligent hardware device, e.g., a Central Processing Unit (CPU), a microcontroller, an ASIC, and etc. The processor 1028 may include memory. The processor 1028 may process the data 1030 and the instructions 1032 received from the memory 1034, and information through the transceiver 1020, the base band communications module, and/or the network communications module. The processor 1028 may also process information to be sent to the transceiver 1020 for transmission through the antenna 1036, to the network communications module for transmission to a core network.

One or more presentation components 1038 presents data indications to a person or other device. Examples of presentation components 1038 may include a display device, speaker, printing component, vibrating component, etc.

From the above description, it is manifested that various techniques may be used for implementing the concepts described in the present application without departing from the scope of those concepts. Moreover, while the concepts have been described with specific reference to certain implementations, a person of ordinary skill in the art may recognize that changes may be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method performed by a User Equipment (UE) for wireless communications, the method comprising:
   receiving a Random Access Response (RAR) comprising an Uplink (UL) grant from a base station, the UL grant indicating a first resource allocation;
   transmitting a first part of a UE Identity (ID) to the base station based on the first resource allocation;
   deriving a second resource allocation from the first resource allocation by shifting the first resource allocation in a time domain;
   transmitting a second part of the UE ID to the base station based on the second resource allocation; and
   receiving a contention resolution message from the base station, wherein the contention resolution message comprises a UE contention resolution ID determined based on the first part of the UE ID and the second part of the UE ID.

2. The method of claim 1, wherein the first part of the UE ID is transmitted in a first Common Control Channel (CCCH) Service Data Unit (SDU), and the second part of the UE ID is transmitted in a second CCCH SDU.

3. The method of claim 2, wherein the UE contention resolution ID comprises the first CCCH SDU and the second CCCH SDU.

4. The method of claim 2, wherein the UE contention resolution ID is represented by a partial UE ID that consists of a portion of the first CCCH SDU and a portion of the second CCCH SDU.

5. The method of claim 2, wherein the UE contention resolution ID is represented by the first CCCH SDU.

6. The method of claim 1, further comprising:
   receiving a Medium Access Control (MAC) Control Element (CE) from the base station;
   wherein the MAC CE comprises a bit field configured to indicate to the UE to transmit the second part of the UE ID.

7. A User Equipment (UE) comprising:
   one or more non-transitory computer-readable media having computer-executable instructions embodied thereon;
   at least one processor coupled to the one or more non-transitory computer-readable media, and configured to execute the computer-executable instructions to:
   receive a Random Access Response (RAR) comprising an Uplink (UL) grant from a base station, the UL grant indicating a first resource allocation;
   transmit a first part of a UE Identity (ID) to the base station based on the first resource allocation;
   derive a second resource allocation from the first resource allocation by shifting the first resource allocation in a time domain;
   transmit a second part of the UE ID to the base station based on the second resource allocation;
   and
   receive a contention resolution message from the base station, wherein the contention resolution message comprises a UE contention resolution ID determined based on the first part of the UE ID and the second part of the UE ID.

8. The UE of claim 7, wherein the first part of the UE ID is transmitted in a first Common Control Channel (CCCH) Service Data Unit (SDU), and the second part of the UE ID is transmitted in a second CCCH SDU.

9. The UE of claim 8, wherein the UE contention resolution ID comprises the first CCCH SDU and the second CCCH SDU.

10. The UE of claim 8, wherein the UE contention resolution ID is represented by a partial UE ID that consists of a portion of the first CCCH SDU and a portion of the second CCCH SDU.

11. The UE of claim 8, wherein the UE contention resolution ID is represented by the first CCCH SDU.

12. The UE of claim 7, wherein the at least one processor is further configured to execute the computer-executable instructions to:
   receive a Medium Access Control (MAC) Control Element (CE) from the base station;
   wherein the MAC CE comprises a bit field configured to indicate to the UE to transmit the second part of the UE ID.

* * * * *